(12) United States Patent
Moeller

(10) Patent No.: US 6,541,053 B2
(45) Date of Patent: Apr. 1, 2003

(54) METHOD FOR COVERING A FOOD PRODUCT WITH COLLAGEN

(75) Inventor: Patrick W. Moeller, Brentwood, TN (US)

(73) Assignee: Mastertaste, Brentwood, TN (US)

( * ) Notice: Subject to any disclaimer, the term of this patent is extended or adjusted under 35 U.S.C. 154(b) by 0 days.

(21) Appl. No.: 09/852,172

(22) Filed: May 9, 2001

(65) Prior Publication Data

US 2001/0022985 A1 Sep. 20, 2001

Related U.S. Application Data

(63) Continuation of application No. 09/193,694, filed on Nov. 17, 1998, now abandoned.

(51) Int. Cl.$^7$ ............................ A23L 1/31; A23L 1/317; A23P 1/12
(52) U.S. Cl. ........................ 426/278; 426/513; 426/516; 426/657
(58) Field of Search ........................ 426/92, 105, 135, 426/140, 278, 513, 516, 657

(56) References Cited

U.S. PATENT DOCUMENTS

| 3,525,125 A | 8/1970 | Berger et al. | |
|---|---|---|---|
| 3,551,535 A | 12/1970 | Henderson et al. | 264/28 |
| 3,622,353 A | 11/1971 | Bradshaw et al. | |
| 3,782,977 A | 1/1974 | Henderson et al. | 426/140 |
| 3,894,158 A | 7/1975 | Miller | 426/277 |
| 3,956,512 A | 5/1976 | Higgins | 426/140 |
| 3,961,083 A | 6/1976 | Coleman | 426/92 |
| 4,171,381 A | 10/1979 | Chui | 426/105 |
| 4,196,220 A | 4/1980 | Chui et al. | 426/105 |
| 4,278,694 A | 7/1981 | Chui | 426/135 |
| 4,540,613 A | 9/1985 | Nicholson et al. | |
| 4,721,623 A | 1/1988 | Coffey et al. | 426/250 |
| 4,877,626 A | 10/1989 | Ande et al. | 426/250 |
| 5,043,174 A | 8/1991 | Lindner | 426/332 |
| 5,104,349 A | 4/1992 | Van Der Dungen | 452/51 |
| 5,271,948 A | 12/1993 | Boni et al. | 426/278 |
| 5,393,542 A | 2/1995 | Stradal et al. | 426/241 |
| 5,599,570 A | 2/1997 | Stribling | 426/105 |
| 5,637,339 A | 6/1997 | Moeller | 426/422 |
| 5,716,656 A | 2/1998 | Stribling | 426/92 |
| 5,795,605 A | 8/1998 | Morgan et al. | 426/277 |
| 5,843,504 A | 12/1998 | Kobussen et al. | 426/277 |

FOREIGN PATENT DOCUMENTS

| EP | 0469652 | 5/1992 |
|---|---|---|
| EP | 0619077 | 12/1994 |
| GB | 1232801 | 5/1991 |
| WO | WO90/12508 | 11/1990 |

*Primary Examiner*—Arthur L. Corbin
(74) *Attorney, Agent, or Firm*—Jenkins & Wilson, P.A.

(57) ABSTRACT

A collagen processing method for thickening or hardening the collagen sufficiently by application of a liquid smoke fraction, obtained from a liquid smoke derivative (a derivative being commercially available as Code V), so that the resultant treated collagen is useful as a casing for a food product. The liquid smoke fraction may be obtained by treating Code V with both carbon and a pH adjustment whereby the method is without an effect on the taste of the food product. In another embodiment, the Code V is only pH adjusted.

6 Claims, No Drawings

METHOD FOR COVERING A FOOD PRODUCT WITH COLLAGEN

This application is a continuation of Ser. No. 09/193,694, filed Nov. 17, 1998, now abandoned.

TECHNICAL FIELD

Liquid smoke has traditionally been used to color and to flavor edible food products. The present invention relates generally to a method for covering a food product with collagen by treating the collagen with a fraction obtained from liquid smoke, as the fraction will thicken (also referred to as cross-link) the collagen, which is useful, for instance, when the food product is sausages and the thickened collagen is a sausage casing. More particularly, the present invention relates to application of a particular kind of a liquid smoke fraction to collagen to effect the thickening, and yet in a preferred embodiment, not impart liquid smoke flavoring, whereby the resultant food product, such as collagen-encased sausages, will taste the same instead of having the characteristic smoky flavoring.

BACKGROUND OF THE INVENTION

There are known processes and apparatuses for simultaneously coextruding comminuted meat (such as sausage mix) and collagen, as disclosed in GB Patent No. 1 232 801 and its counterpart U.S. Pat. No. 3,622,353, both to Bradshaw and Taylor. These patents disclose an apparatus that extrudes a cylindrical core of sausage meat mix and simultaneously extrudes around the mix an outer collagen gel. The gel has a high water content and is coagulated by removal of some of the water by osmosis by passage through a concentrated sodium chloride bath. However, the thickening of the collagen so it is a casing is not complete at this point, as a result of which the casing is relatively weak in terms of mechanical properties, such as sufficient strength to enable crimping or twist linking in sausage making. In the conventional process, treatment in the bath of sodium chloride is followed by transportation to a hot air drying cabinet so that the hot air can complete the thickening of the collagen casing, and also, at the same time, the heat causes some partial cooking of the sausage meat.

Prior to the above-noted apparatus by Bradshaw and Taylor for simultaneous coextrusion, it has long been known first to extrude a tubular collagen casing that has been sufficiently thickened (also known in the art as hardened) so that then the casing may be stuffed with sausage meat mix coming off an extruder. This older method is not preferred because it requires separate apparatuses for making the tubular collagen casing and then for shirring it and then for stuffing it with the sausage meat mix.

Additionally, it is noted that various treatment methods have been disclosed in the prior art for thickening (or hardening) the collagen.

For instance, EP Published Patent Application No. 0 619 077 A1 to Van Doorne and Van Esbroeck discloses removing water from the collagen so that the collagen contains a maximum of 92% water, followed by treating the resultant with acid having a pH of 3 to 4.

Furthermore, U.S. Pat. No. 3,894,158 to Miller discloses incorporating liquid smoke into an extrusion mass of acid-swollen collagen, extruding the resultant into the shape of a casing, and then drying the resultant to form the collagen casing.

Additionally, U.S. Pat. No. 4,196,220 to Chiu and Smith discloses collagen casings made by treating the collagen with a coating mixture of albumin and liquid smoke, where the liquid smoke has a pH greater than about 4 and also contains a water soluble alcohol solubilizing agent to keep flavor constituents in solution (prevent them from separating out), whereby the casing is suitable for imparting intensified smoke color to the food product inside the casing.

Also, U.S. Pat. No. 4,278,694 to Chiu discloses a collagen food casing having a coating that is a mixture of smoke coloring and flavoring constituents, that contains a water soluble alcohol solubilizing agent to keep the constituents in solution (i.e., prevent them from separating out), and that also has a pH greater than about 4.

Moreover, U.S. Pat. No. 5,716,656 to Stribling discloses a collagen casing that contains an encapsulated smoke component that releases the smoke during cooking, where the encapsulating material is a lipid, such as an oil soluble fatty acid.

As discussed further in the Laboratory Examples below, an acetic derivative obtained from liquid smoke, the derivative being commercially available under the trade name Code V, is treated in a certain way to obtain a fraction and then the fraction is employed for treating collagen in order to thicken it, in accordance with the present invention.

Code V is manufactured by Hickory Specialties, Inc. of Brentwood, Tenn., and is described in U.S. Pat. No. 5,043,174 to Lindner, assigned to Hickory Specialties, Inc. of Brentwood, Tenn. More particularly, this patent discloses a process for curing meat comprising applying an acetic derivative obtained from liquid smoke to the meat subsequent to the peeling step and prior to the packing step to control *Listeria monocytogenes* re-inoculation of the meat. Code V liquid smoke derivative solution comprises: acetic acid in a concentration of about 6.5 to 8.0% weight per unit volume (w/v); carbonyl in a concentration of about 1.0 to 8.0% weight per unit volume (w/v); phenol in a concentration of about 0.1 to 1.0% weight per unit volume (w/v); and water in a concentration of about 83.0 to 92.4% weight per unit volume (w/v). The specific application of the liquid smoke solution as disclosed by Lindner occurs to cooked meat between the two above-noted peeling and packing steps in a meat processing sequence for curing meat which includes the steps of grinding and blending selected meat, stuffing the meat into casings, applying liquid smoke to the meat, cooking the meat in a smokehouse, chilling the meat, peeling the casings from the meat, and packing the meat for shipment.

The disclosures of all patents mentioned herein are incorporated by reference.

Despite the methods discussed above, there exists substantial room for improvement in the art for providing a practical and more effective method of thickening collagen particularly when it is desired not to impart a smokey flavor to a food product.

SUMMARY AND OBJECTS OF THE INVENTION

In accordance with the present invention, a collagen processing method is provided which is designed more practically and effectively to harden collagen on food products ultimately for consumption, such as to form collagen casings on sausage. The method comprises application of a fraction obtained from a liquid smoke derivative solution to collagen. The liquid smoke derivative solution is treated in order to adjust the pH to about 5.0 or higher, resulting in the fraction. In a preferred embodiment, the liquid smoke derivative solution is first treated with carbon, which reduces phenolic flavor components, followed by adjusting the pH to about 5.0 or higher (although the pH adjustment may be performed prior to the carbon treatment), resulting in a carbon-treated fraction. The preferred liquid smoke derivative solution comprises: acetic acid in a concentration of about 6.5 to 8.0% weight per unit volume (w/v); carbonyl in a concentration of about 1.0 to 8.0% weight per unit volume (w/v); phenol in a concentration of about 0.1 to 1.0% weight per unit volume (w/v); and water in a concentration of about 83.0 to 92.4% weight per unit volume (w/v).

The liquid smoke fraction (or carbon-treated fraction) of the present invention is then applied to collagen in a sufficient amount in order to thicken it, such as for forming a collagen casing on sausage. The sausage may be raw, partially cooked, or fully cooked.

It is therefore an object of the present invention to provide a novel collagen processing method which does not require a very low pH, like the prior art liquid smoke treatment.

It is still another object of the present invention to provide a novel collagen processing method which in one embodiment imparts little or no flavoring to the food product.

It is a still further object of the present invention to provide a novel collagen processing method which can be effectively applied to raw meat as well as to cooked meat.

It is an advantage of the present invention that the novel collagen processing method obviates problems with corrosion of equipment caused by prior art methods using a highly acidic low pH liquid smoke solution.

Some of the objects of the invention having been stated, other objects, as well as other advantages, will become evident as the description proceeds in connection with the Laboratory Examples below.

DETAILED DESCRIPTION OF THE INVENTION

The present invention is directed to a collagen processing method utilizing a solution obtained from further treatment of an acetic liquid smoke derivative, the further treated material referred to herein as a liquid smoke fraction. The liquid smoke fraction, as applied in accordance with this invention, serves to thicken the collagen.

Liquid smoke is commercially available from Hickory Specialties, Inc., of Brentwood, Tenn., under the trade name "Zesty Smoke Code 10". This liquid smoke can be utilized to obtain the liquid smoke derivative known as Code V (also manufactured by Hickory Specialties, Inc. of Brentwood, Tenn.) used for the preferred starting material of this invention and used in U.S. Pat. No. 5,043,174 to Lindner discussed previously. The specifications of Code 10 are set forth below.

| ZESTI SMOKE (Code 10) Liquid Smoke Specifications | |
|---|---|
| Acidity % w/v | 10.5–11.0 |
| Staining Index | 69–80 |
| Carbonyl Level (g/100 ml) | 15–25 |
| Phenol Level (mg/ml) | 12–22 |
| Specific Gravity @ 25° C. | 1.068–1.079 |
| Density (lbs/gal) | 8.90–8.99 |
| pH Level | 2–3 |
| Color | Amber |

The Code V fraction utilized as a preferred starting material by the present invention can be produced as a derivative or by-product of Code 10.

The Code 10 is preferably processed through a separator (for example, an AVP evaporator) by feeding the Code 10 as a feed stock which is first heated to remove low boiling acids from the top of the evaporator and then is condensed into Code V as a by-product. This process also yields a concentrated liquid smoke that has higher % acid, staining index, carbonyl and phenol levels, specific gravity, density and darker color than conventional liquid smoke, and that is sold under the trademark SUPERSMOKE® by Hickory Specialties, Inc. of Brentwood, Tenn. for a variety of end uses.

The Code V derivative is a low pH, low flavor, low or no stain product. The commercial use of Code V is by Hickory Specialties, Inc. of Brentwood Tenn. to inhibit microorganisms such as Listeria pursuant to U.S. Pat. No. 5,043,174 to Lindner, as discussed previously. The preferred Code V possesses the following specifications:

| Preferred Code V Derivative Solution Specifications | |
|---|---|
| Acidity % w/v | 6.8–7.8 |
| Staining Index | None |
| Specific Gravity | 1.005–1.015 |
| Carbonyl (g/100 ml) | 2.0–7.0 |
| Phenol (mg/ml) | 1.0–4.0 |
| pH Level | 2.0–2.4 |
| Color | Amber |

Code V, and more preferably, the preferred Code V, is then treated with a suitable pH adjustment agent, such as sodium bicarbonate, sodium carbonate, sodium hydroxide, or potassium hydroxide, in order to bring the pH up to at least about 5.0. The pH may be brought up to as high as about 7.0. Preferably, the pH ranges from about 5.0 to about 6.0. This pH adjusted material is referred to herein as a liquid smoke fraction.

In an alternative embodiment, the Code V, and more preferably, the preferred Code V, is first treated with carbon in accordance with the method disclosed in U.S. Pat. No. 5,637,339 to Moeller. This removes phenols. The resultant is then treated with the suitable pH adjustment agent. Optionally, the pH adjustment may be performed prior to the carbon treatment. This carbon treated, pH adjusted material is referred to herein as a carbon-treated liquid smoke fraction.

Next, in accordance with the preferred embodiment, using the process and apparatus essentially as disclosed in the above-noted GB Patent and U.S. Patent to Bradshaw and Taylor for simultaneous coextrusion, a tubular form is made of fresh, raw sausage mix having directly around it a covering of collagen. The collagen is treated with the fraction, such as by a shower of the fraction in order to harden the collagen. Also, a bath of the fraction could be employed through which the product would be passed. Additionally, it is noted that partially cooked or cooked instead of raw sausage mix could be employed. Also, food products other than sausage could be employed.

Surprisingly, the fraction worked for hardening the collagen to form a casing, after which the tube was cut into sausages. The reason this was surprising is that the pH was so high but not in the basic range, whereas, as described in lines 19–39, column 2, U.S. Pat. No. 5,795,605 to Morgan et al., hardening of collagen into a casing is best achieved at a very low acidic pH of 2.0 or a very high basic pH of 13.0. This is why conventional liquid smoke solutions work well because 2.0 is the typical pH of such conventional solutions.

In another alternative embodiment, it is also contemplated that the treatment of the collagen with the fraction could be effected separately to form a collagen casing, and the casing stuffed with sausage mix. The fraction could be pH adjusted, or could be both carbon treated and pH adjusted. Separate extruders, one for the sausage mix and one for the collagen casing, are well known in the art.

It is noted that in the embodiment that encompasses effecting the pH adjustment on Code V (or on the preferred Code V) so that the pH is at least 5.0, but not effecting the carbon treatment, then due to the absence of the carbon treatment, the resultant sausages should have a smokey flavor when eaten.

As mentioned above, the pH adjustment has the advantage in that the fraction is not so highly acidic like conventional liquid smoke. This aspect of the present invention helps to obviate corrosion problems from contact with equipment. In the event that Code V (or the preferred Code V) is only pH adjusted (and not also carbon treated) for use in treating the collagen to harden the collagen into a casing, it is noted that advantageously no water soluble alcohol solubilizing agent is necessary for maintaining the flavoring constituents in solution. This is in contrast to the requirement for a water soluble alcohol solubilizing agent as is required in the above-noted U.S. Pat. No. 4,278,694 to Chiu. Of course, in the embodiment in which Code V (or the preferred Code V) is both carbon treated and pH adjusted, there is no need for a water soluble alcohol solubilizing agent since the composition has already been depleted of the phenolic flavoring constituents due to the carbon treatment.

LABORATORY EXAMPLES

Comparison

Using a process and apparatus essentially like that in the above-mentioned GB Patent and U.S. Patent to Bradshaw and Taylor for simultaneous coextrusion of sausage and collagen, a fresh, raw sausage mix was made into a tubular form covered with collagen. During the coextrusion, the collagen was treated with a shower of the above-noted preferred Code V in order to harden the collagen into a casing. The resultant was cut into sausages. When some of the sausages were cooked and then eaten, a distinctive smokey flavor was noticed.

As expected, the highly acidic Code V (pH was about 2.0 to 2.4) worked well in hardening the collagen.

Example

This time, the above-noted preferred Code V was first treated with carbon in accordance with the method disclosed in the above-noted U.S. Pat. No. 5,637,339 to Moeller, resulting in a phenol depleted solution. The resultant was then adjusted with sodium bicarbonate to a pH of 5.0.

This carbon treated, pH adjusted material, referred to herein as a carbon-treated liquid smoke fraction, was then used during the coextrusion (as described in the above paragraph) for hardening the collagen to form a collagen casing around the sausage mix. The carbon-treated fraction was applied by way of a shower, but also it could have been applied as a bath for the product to pass through. The collagen casing was sufficiently strong to allow for mechanical twisting. The resultant was then cut into sausages. After some of the sausages were cooked and then eaten, no smokey flavoring was noticed.

The process was repeated with various aqueous dilutions of the carbon-treated fraction up to 1 part carbon-treated fraction and 4 parts water, and still the process worked well for hardening the collagen to form the casing on the sausage.

It will be understood that various details of the invention may be changed without departing from the scope of the invention. Furthermore, the foregoing description is for the purpose of illustration only, and not for the purpose of limitation as the invention is defined by the following, appended claims.

What is claimed is:

1. In a method of covering a food product with collagen, said method comprising extruding the food product and arranging directly around the food product, by means of extruding, collagen that is subjected to treatment to harden the collagen sufficiently to form a casing, the improvement comprising treating the collagen with a sufficient amount of a liquid smoke fraction to cross-link and to thicken the collagen sufficiently to harden the collagen to form a casing, wherein the liquid smoke fraction:
   (a) has a pH ranging from at least about 5.0 up to about 7.0,
   (b) is carbon treated to have a phenolic flavor component content less than about 1.0 mg/ml, and
   (c) has a low stain index or a stain index of none.

2. The method of claim 1, wherein extruding of the food product and the collagen occurs by separate steps (a) and (b), where step (a) is extruding of the collagen, including treating with the liquid smoke fraction having a pH of at least about 5.0 up to about 7.0, to form the hardened collagen and step (b) is extruding of the food product into the hardened collagen.

3. The method of claim 1, wherein the extruding of the food product and the collagen comprises simultaneously extruding the food product and the collagen, and wherein the collagen simultaneously extruded with the food product is treated with the liquid smoke fraction having a pH of at least about 5.0 up to about 7.0 during the process of simultaneously extruding the food product and the collagen.

4. The method of claim 1, wherein the food product is selected from the group consisting of raw meat, partially cooked meat, and cooked meat.

5. The method of claim 4, wherein the raw meat is raw sausage, the partially cooked meat is partially cooked sausage, and the cooked meat is cooked sausage.

6. The method of claim 1, wherein the liquid smoke fraction is obtained from a liquid smoke derivative having the following properties:
   (a) acidity content of about 6.8 to about 7.8% weight/volume,
   (b) low staining index or staining index of none,
   (c) specific gravity of about 1.005 to about 1.015,
   (d) carbonyl content of about 2.0 to about 7.0 grams/100 milliliters,
   (e) phenol content of about 1.0 to about 4.0 milligrams/milliliter, and
   (f) color of amber,
and wherein the liquid smoke derivative is pH adjusted to have a pH of at least about 5.0 up to about 7.0.

* * * * *